(12) United States Patent
Friederich et al.

(10) Patent No.: US 7,681,600 B2
(45) Date of Patent: Mar. 23, 2010

(54) HOSE MADE OF THERMOPLASTIC POLYMER

(75) Inventors: Hans-Werner Friederich, Winsen (DE); Jörg Vortkort, Garstedt (DE)

(73) Assignee: Phoenix Fluid Handling Industry GmbH, Hamburg (DE)

( * ) Notice: Subject to any disclaimer, the term of this patent is extended or adjusted under 35 U.S.C. 154(b) by 1071 days.

(21) Appl. No.: 10/568,796

(22) PCT Filed: Dec. 4, 2004

(86) PCT No.: PCT/DE2004/002668

§ 371 (c)(1), (2), (4) Date: Feb. 17, 2006

(87) PCT Pub. No.: WO2005/082613

PCT Pub. Date: Sep. 9, 2005

(65) Prior Publication Data

US 2006/0201569 A1 Sep. 14, 2006

(30) Foreign Application Priority Data

Feb. 27, 2004  (DE) .................. 10 2004 009 634

(51) Int. Cl.
*F16L 11/00* (2006.01)

(52) U.S. Cl. ............... 138/123; 138/124; 138/125; 138/137; 138/141; 138/140; 428/36.91

(58) Field of Classification Search ......... 138/123–125, 138/137, 140, 141, DIG. 1, DIG. 7; 428/36.91
See application file for complete search history.

(56) References Cited

U.S. PATENT DOCUMENTS

| 3,988,189 | A | * | 10/1976 | Sullivan | 156/143 |
| 4,276,908 | A | * | 7/1981 | Horne | 138/125 |
| 4,361,455 | A | * | 11/1982 | Arterburn | 156/149 |
| 4,603,712 | A | | 8/1986 | Krause et al. | 138/137 |
| 5,427,831 | A | | 6/1995 | Stevens et al. | 428/36.2 |
| 5,670,566 | A | * | 9/1997 | Liedermooy et al. | 524/271 |
| 5,928,782 | A | * | 7/1999 | Albrecht | 428/355 EN |
| 6,068,026 | A | | 5/2000 | Garois et al. | 138/126 |
| 6,695,015 | B1 | * | 2/2004 | Ono et al. | 138/126 |

FOREIGN PATENT DOCUMENTS

| DE | 33 32550 C2 | 3/1985 |
| EP | 0 149 805 B1 | 7/1985 |
| EP | 0 567 115 B1 | 10/1993 |
| EP | 0 821 035 A | 1/1998 |
| EP | 0 848 794 B | 6/1998 |
| EP | 0 862 996 A | 9/1998 |
| EP | 0 895 013 A | 2/1999 |

* cited by examiner

*Primary Examiner*—Patrick F Brinson
(74) *Attorney, Agent, or Firm*—Collard & Roe, P.C.

(57) ABSTRACT

The invention relates to a hose made of a thermoplastic polymer comprising a core and a cover provided with a reinforcement, in particular in the form of a multilayer reinforcing structure, wherein each core and cover consists of a thermoplastic polymer and wherein, according to the invention, an intermediate coupling layer is incorporated into the core and/or cover material by welding and is connected in the form of a reinforcement. The appropriated variants of the embodiment of the intermediate coupling layer are also enclosed.

22 Claims, No Drawings

HOSE MADE OF THERMOPLASTIC POLYMER

CROSS REFERENCE TO RELATED APPLICATIONS

Applicants claim priority under 35 U.S.C. §119 of German Application No. 10 2004 009 634.1 filed Feb. 27, 2004. Applicants also claim priority under 35 U.S.C. §365 of PCT/DE2004/002668 filed Dec. 4, 2004. The international application under PCT article 21(2) was not published in English.

The invention relates to a hose, comprising a core and a cover having an embedded reinforcement support, specifically in the form of a single-layer or multi-layer reinforcement structure, whereby the core and the cover consist of a thermoplastic elastomer, in each instance.

With regard to the hose structure indicated above, there is a comprehensive prior art that furthermore describes a multiplicity of reinforcement support variants, whereby reference is made, for example, to the following references: DE 33 32 550 C2, EP 0 149 805 B1, EP 0 567 115 B1, and EP 0 848 794 B1. The reinforcement support consists of a textile and/or metallic material and is based on the purpose of use. With regard to the varied purposes of use for hoses, the following examples can be mentioned: water hoses, compressed air hoses, oil and gasoline hoses, hoses for chemicals, steam hoses, and hydraulic hoses.

Nowadays, hoses are produced from diverse materials, for example from rubber, plastics (PVC), and rubber/plastic compounds. The hose of the type stated is produced from a thermoplastic elastomer (abbreviation TPE). In particular, thermoplastic elastomers on a styrene basis (TPE-S), non-crosslinked or partially crosslinked thermoplastic elastomers on an olefin basis (TPE-O), and fully crosslinked thermoplastic elastomer on an olefin basis (TPE-V) are used. The actual production of a hose is state of the art today.

An appropriate TPE inner layer (core) is extruded. Now the reinforcement support is applied. Subsequently, the TPE outer layer is formed (mantle, cover). The problem in this production is that a combination body is produced for technically highly demanding articles, in which the individual layers must undergo bonding. As a rule, in the case of plastic hoses, the combined body is produced in that the inner and outer layer are bonded to one another by way of the thread gaps. However, there is no adhesion to the actual reinforcement support material.

At the moment when high-quality hoses are produced, however, it is necessary to build more reinforcement supports into the hoses, and therefore small thread gaps are obtained. This goes so far that the reinforcement support lies closely against itself, and there are no longer any thread gaps present. In this case, it is absolutely necessary for the core and cover material to enter into adhesion with the reinforcement support. However, this is not possible with conventional TPE materials.

With the background of the aforementioned problems, the hose according to the invention is characterized in that an adhesion-imparting intermediate layer is worked in, which can be bonded to the core and/or cover material and therefore enters into a bond with the reinforcement support. In this connection, bonding takes place within the scope of the production process.

With regard to the arrangement of the adhesion-imparting intermediate layer, the following three variants can be used, in particular:

The adhesion-imparting intermediate layer is extruded directly onto the core, whereby the reinforcement support is then laid directly onto the intermediate layer.

The adhesion-imparting intermediate layer is extruded directly onto the reinforcement support, whereby the cover is worked on subsequently.

The adhesion-imparting intermediate layer is applied to the core and to the cover, so that the reinforcement support is completely bonded into the intermediate layer. This variant is particularly advantageous, particularly if there are no longer any thread gaps.

In the case of multi-layer hoses (EP 0 567 115 B1), the adhesion-imparting intermediate layer is applied between the individual reinforcement supports, whereby the variants mentioned above can additionally be used.

The adhesion-imparting intermediate layer has a minimal melting point of 75° C. and a maximal melting point of 170° C.

The advantageous materials with regard to the adhesion-imparting intermediate layer are:

An olefin plastic is used, particularly on the basis of polyethylene or polypropylene. In this connection, the reinforcement support is surrounded with twisted yarns of the olefin plastic, or the olefin plastic is applied directly to the reinforcement support.

The adhesion-imparting intermediate layer consists of a TPE (TPE-S, TPE-O, TPE-V) and a hydrocarbon resin, particularly an aromatic hydrocarbon resin, as well as other additives, if necessary. The hydrocarbon resin component amounts to 2 to 50 wt.-% in this connection, particularly 5 to 30 wt.-%.

The adhesion-imparting intermediate layer is an acrylate copolymer, particularly an ethylene/acrylate copolymer. In this regard, again, the following should be particularly mentioned: ethylene methyl acrylate (EMA), ethylene ethyl acrylate (EEA), or ethylene butyl acrylate (EBA). A hydrocarbon resin, particularly again, an aromatic hydrocarbon resin, as well as other additives, if necessary, is/are mixed into the acrylate copolymer. Here again, the hydrocarbon resin component amounts to 2 to 50 wt.-%, particularly 5 to 30 wt.-%.

Here, another component in the form of a functionalized polymer is preferably added to the adhesion-imparting intermediate layer. This additional component is a malein anhydride graft polyethylene or a polypropylene grafted in similar manner, or an acrylate copolymer functionalized with polar CO groups or epoxy groups. The proportion of the functionalized polymer is 0.5 to 20 wt.-%, particularly 2 to 10 wt.-%.

The adhesion-imparting intermediate layer is a hydrocarbon resin, particularly an aromatic hydrocarbon resin. In this connection, the hydrocarbon resin has a plastification point of 75° C. to 145° C., particularly 100° C. to 145° C.

The data given above in wt.-% relate to the total mass of the adhesion-imparting intermediate layer.

The invention claimed is:

1. Hose, comprising a core and a cover having an embedded reinforcement support in the form of a single-layer or multi-layer reinforcement structure, whereby the core and the cover comprise a thermoplastic elastomer, in each instance, wherein an adhesion-imparting intermediate layer comprising an olefin plastic is worked in, bonded to at least one of the core and the cover material, and enters into a bond with the reinforcement support and wherein the reinforcement support is surrounded with twisted yarns of the olefin plastic.

2. Hose according to claim 1, wherein the adhesion-imparting intermediate layer is extruded directly onto the core, and the reinforcement support is laid directly onto the intermediate layer.

3. Hose according to claim 1, wherein the adhesion-imparting intermediate layer is extruded directly onto the reinforcement support, and the cover is worked on subsequently.

4. Hose according to claim 1, wherein the adhesion-imparting intermediate layer is applied to the core and to the cover, so that the reinforcement support is completely bonded into the intermediate layer.

5. Hose according to claim 1, wherein in the case of multi-layer hoses, the adhesion-imparting intermediate layer is applied between the individual reinforcement supports.

6. Hose according to claim 1, wherein the adhesion-imparting intermediate layer has a minimal melting point of 75° C.

7. Hose according to claim 1, wherein the adhesion-imparting intermediate layer has a maximal melting point of 170° C.

8. Hose according to claim 1, wherein the olefin plastic is polyethylene or polypropylene.

9. Hose according to claim 1, wherein the olefin plastic is applied directly to the reinforcement support.

10. Hose according to claim 1, wherein the adhesion-imparting intermediate layer comprises a thermoplastic elastomer and a hydrocarbon resin.

11. Hose according to claim 10, wherein the thermoplastic elastomer comes from the group TPE-S, TPE-O, or TPE-V.

12. Hose according to claim 10, wherein the hydrocarbon resin component amounts to 2 to 50 wt.-%.

13. Hose according to claim 1, wherein the adhesion-imparting intermediate layer is an acrylate copolymer.

14. Hose according to claim 13, wherein the adhesion-imparting intermediate layer is an ethylene/acrylate copolymer.

15. Hose according to claim 14, wherein the adhesion-imparting intermediate layer is a copolymer on the basis of ethylene methyl acrylate (EMA), ethylene ethyl acrylate (EEA), or ethylene butyl acrylate (EBA).

16. Hose according to claim 13, wherein a hydrocarbon resin is mixed into the acrylate copolymer.

17. Hose according to claim 16, wherein the hydrocarbon resin component amounts to 2 to 50 wt.-%.

18. Hose according to claim 10, wherein another component in the form of a functionalized polymer is added to the adhesion-imparting intermediate layer.

19. Hose according to claim 1, wherein the adhesion-imparting intermediate layer is a hydrocarbon resin.

20. Hose according to claim 19, wherein the hydrocarbon resin has a plastification point of 75° C. to 145° C.

21. Hose, comprising a core and a cover having an embedded reinforcement support in the form of a single-layer or multi-layer reinforcement structure, whereby the core and the cover comprise a thermoplastic elastomer, in each instance, wherein an adhesion-imparting intermediate layer comprising a thermoplastic elastomer, a hydrocarbon resin, and a functionalized polymer is worked in, bonded to at least one of the core cover material, and enters into a bond with the reinforcement support, wherein the functionalized polymer is a malein anhydride graft polyethylene or malein anhydride graft polypropylene, or an acrylate copolymer functionalized with polar CO groups or epoxy groups.

22. Hose, comprising a core and a cover having an embedded reinforcement support in the form of a single-layer or multi-layer reinforcement structure, whereby the core and the cover comprise a thermoplastic elastomer, in each instance, wherein an adhesion-imparting intermediate layer comprising a thermoplastic elastomer, a hydrocarbon resin, and a functionalized polymer is worked in, bonded to at least one of the core cover material, and enters into a bond with the reinforcement support, wherein the proportion of the functionalized polymer is 0.5 to 20 wt.-%.

* * * * *